Patented Dec. 6, 1938

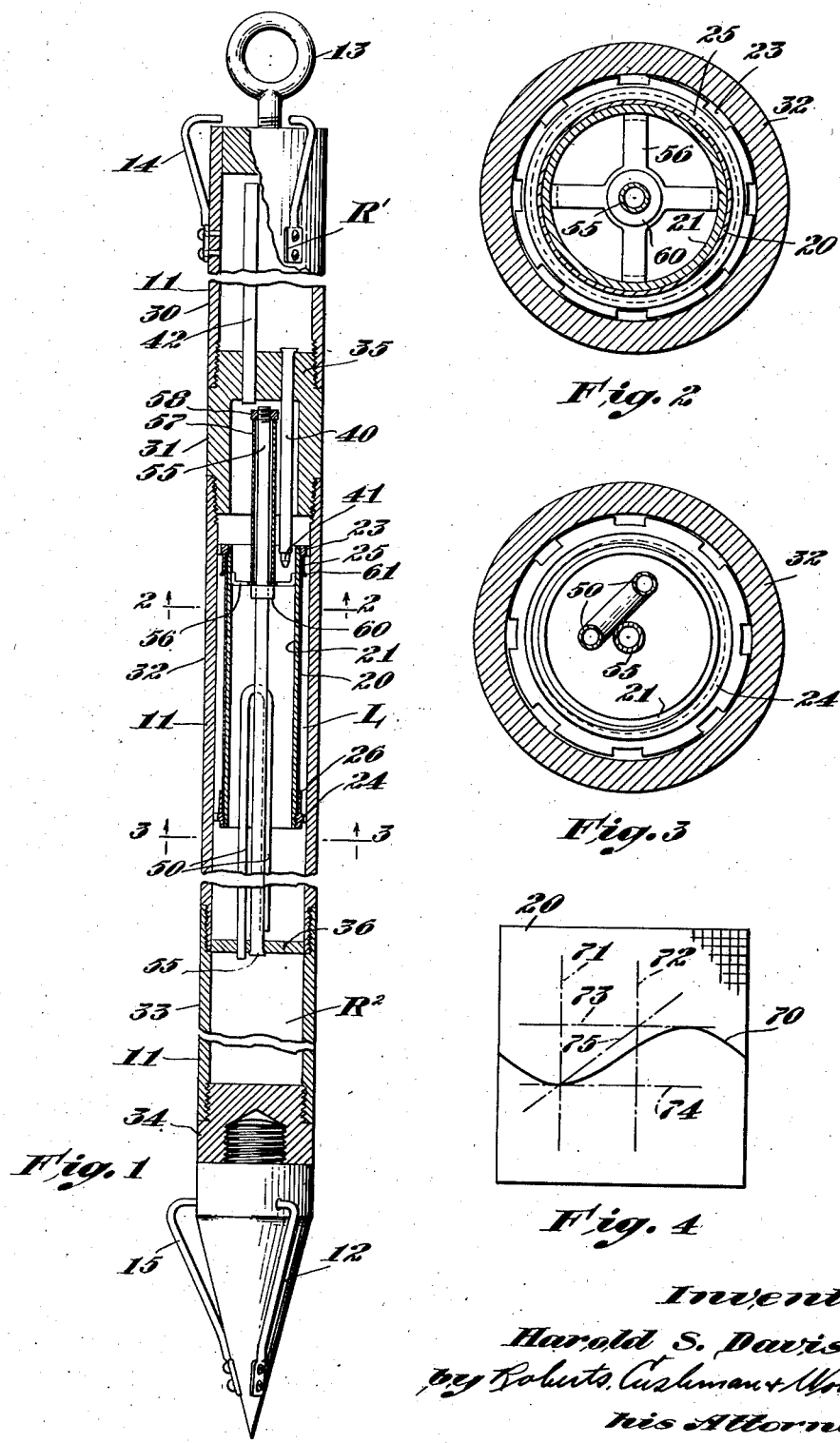

2,139,444

UNITED STATES PATENT OFFICE 2,139,444

APPARATUS FOR MEASURING INCLINATIONS

Harold S. Davis, Belmont, Mass., assignor, by mesne assignments, to Sperry-Sun Well Surveying Company, Philadelphia, Pa., a corporation of Delaware Application February 8, 1930, Serial No. 426,878

6 Claims. (Cl. 33—205.6)

This invention relates to a method and apparatus for measuring the inclination of a hole from the vertical at any predetermined point at its depth, and is particularly applicable for use in ascertaining whether any change of direction or inclination occurs in drilling an oil well.

Changes of inclination or direction of drilled holes introduce serious mechanical difficulties. When a rotary drill is used, difficulties may be experienced in running or in pulling the drill stem or it may twist off. Troubles may arise in running casing into the open hole or one string of casing into another. The pipe may collapse or part. The sides of the hole may cave in. Where a steel cable is used, as in cable-tool drilling or in swabbing operations, the cable may wear through a casing which has been set. When the well is pumped, there may be trouble with broken rods and rod-cut tubing. Again due to changes in inclination or direction of the hole, erroneous estimates may be made of its depth or of its position relative to the surface at any point, matters which are of importance to the petroleum geologist.

Plainly a device is needed by which there can be ascertained at any time whether or not the hole is being drilled straight. If it is not going straight, then several methods are known by experienced men to correct the trouble.

My invention involves the recording of the relative inclination of a free liquid surface (which is naturally horizontal) to the bore hole at a desired point in its depth by allowing this horizontal liquid surface to make a line or curve on a recording surface carried by a measuring instrument partaking of the inclination of the bore hole, and has for some objects to prevent erroneous or obscure readings due to splashing of the liquid or changes in angular position of the measuring instrument while being sent into and withdrawn from the hole, to provide for rapid determination of the inclination, to render certain the measurement of the inclination at the desired point in the hole and to insure that the reading thus obtained will not be affected by the inclination at other points in the hole. Other objects and advantageous features of my invention will be apparent from the following specification and accompanying drawing.

In the practice and use of my invention electric currents and connections and complicated apparatus are unnecessary, and the measurements may be taken in a simple manner and without the use of apparatus likely to get out of order.

By my invention the liquid and a recording surface are preferably kept separate while the instrument is being lowered into position in the hole. They are then brought together and after the record of the liquid level has been made they are separated so that the instrument can be safely withdrawn without any danger that the clearly defined line which marked the liquid level will be obscured.

I have provided mechanism for bringing the liquid and the recording surface together after a predetermined time and mechanism for later separating the liquid and the recording surface. Obviously in certain aspects of the invention the recording surface may be moved into contact with the liquid or the liquid may be moved into contact with the recording surface, and likewise, after the liquid has reacted upon the recording surface, the recording surface may be moved out of contact with the liquid or the liquid may be moved out of contact with the recording surface. I prefer, however, to move the liquid into contact with the recording surface and, after allowing the liquid to react thereon, to move the liquid out of contact with the recording surface. To enable those skilled in the art to practice my invention I shall described, by way of example only, one preferred embodiment of a suitable apparatus, reference being made to the accompanying drawing wherein:

Fig. 1 is a vertical section of an improved delayed measurement inclinometer embodying my invention;

Fig. 2 is a section on the line 2—2 of Fig. 1 on an enlarged scale;

Fig. 3 is a section on the line 3—3 of Fig. 1 on an enlarged scale; and

Fig. 4 is a plan view of a chart adapted for use as the recording surface of the device, and illustrates diagrammatically a graphical method of determining from the record obtained, the inclination of the hole.

Referring to Fig. 1, the device, which is intended to be lowered to the desired depth in a drilled hole, is preferably enclosed in an elongated cylindrical protective casing, preferably of non-corrosive material such as brass, indicated generally by the reference character 11, and provided at its lower end with a pointed detachable nose-piece 12 serving as a weight and at its upper end with an eye 13 adapted to receive a cable. Flexible guide members 14 and 15 (of which three of each are preferably employed) are provided at the upper and lower ends of the casing for causing it to conform to the inclination of a drilled hole of somewhat larger diameter than the casing.

For ease in preparing the apparatus for use and in dismantling the apparatus after use, the casing preferably comprises four generally cylindrical elements 30, 31, 32 and 33 screw-threaded together as shown, and a lower end plug 34 threaded to cylinder 33 and to the nose-piece 12, but obviously the number of joints in the casing is not essential to the recording operation of the apparatus.

Within a suitable container or recording chamber L, here shown as defined by cylindrical elements 31 and 32 and partitions 35 and 36, and adapted to hold liquid during the recording operation, I provide a suitable recording surface, preferably of cylindrical form with its axis parallel or coincident with the axis of the instrument casing. In order to permit this recording surface, after the record is made, to be flattened for easily determining the angle of inclination, I prefer to use as a recording surface some flexible record sheet, for example of paper. In the present embodiment a cylindrical paper chart 20 is employed as the recording surface and for the purpose of supporting and retaining this chart I have provided a chart-retaining cylinder 21 spaced from the inner wall of the casing by upper and lower spacer rings 23 and 24. Rings 23 and 24 are provided with vertical extensions 25 and 26 lying closely adjacent the outer surface of the chart-retaining cylinder 21 and serving to hold the chart in place upon the chart-retaining cylinder.

As shown in Fig. 1, upper ring 23 is provided with a deflector collar 61 extending close to the inner surface of the wall of the casing, and serving to transfer to that wall any drops of liquid that might otherwise run down across the recording surface of the chart 20.

The chart-retaining cylinder 21 preferably is held during use in a fixed position within chamber L by means of a central support, herein shown as tube 55, useful also as a conduit for air and liquid as hereinafter described. A web or bracket 56 is attached to the inner surface of the chart-retaining tube and is secured near the tube 55 to an upwardly extending tube 57 carrying a screw-threaded nut 58 at its upper end engaging corresponding threads on the tube 55, and permitting the tube 57, bracket 56, and chart-retaining cylinder 21 to be removed from the casing. With sections 31 and 32 of the casing separated, the chart-retaining cylinder 21 may be screwed down by means of the threaded connection between nut 58 and tube 55, until the bracket 56 abuts a fixed stop 60 on the tube 55 whereupon the chart-retaining cylinder is securely held in place.

I have provided means for retaining a liquid out of contact with the recording surface and for bringing the liquid into contact with the recording surface at a predetermined time or after a definite time interval. In the illustrated embodiment a reservoir $R^1$ is located above the recording surface, and provided with an exit duct 40 leading to chamber L and having a restricted flow due to the provision of a restricted outlet 41. This exit duct preferably discharges, as shown, within the interior of the chart cylinder 21 in order that the liquid may not contact immediately with the recording surface thereon. The exit duct from reservoir $R^1$ is preferably continuously open; hence the flow of liquid from the reservoir $R^1$ will commence as soon as the parts of the apparatus are assembled as shown and will continue until reservoir $R^1$ is emptied. The recording surface 20, as shown, is located at a certain distance above the bottom 36 of the chamber L, so that flow of liquid from reservoir $R^1$ takes place for a certain time before the liquid reaches the recording surface, or at least before the liquid reaches the portion of the recording surface upon which the record line indicative of the inclination will be made. Thus, the device may be lowered to the desired level in the hole before the record is made, avoiding splashing of the liquid upon the recording surface. By suitably proportioning the amount of liquid originally contained in reservoir $R^1$, the size of the restricted outlet 41 and the height of the recording surface above the bottom of chamber L, the liquid may be caused to reach the desired height upon the record surface at any predetermined time after flow commences. To equalize the air pressure between reservoir $R^1$ and chamber L, and also to permit reservoir $R^1$ to be filled with liquid, as hereinafter described, I have provided an air and liquid inlet tube 42 leading from chamber L to the upper end of the reservoir $R'$.

I have also provided means for removing the liquid from contact with the recording surface. In the embodiment illustrated, this comprises an outlet tube 50, having an entrance near the lower part of the chamber L, extending upwardly within the chart cylinder to the level at which the record is to be taken, and there bent back upon itself to extend downwardly to and through the bottom 36 of the chamber. Thus U-shaped outlet tube 50 comprises an automatic siphon which remains inoperative until the level of the liquid in chamber L reaches the uppermost point of the tube, (the record being made by the liquid at this point), whereupon the siphon operates to remove the liquid from chamber L to a lower reservoir $R^2$. To equalize the air pressure between reservoir $R^2$ and chamber L, and also to facilitate emptying reservoir $R^2$ of liquid after the device is removed from the hole, I provide an air and liquid exit tube extending from the upper part of reservoir $R^2$ to the upper part of chamber L, and conveniently employ the tube 55 for this purpose. I prefer to construct all of the parts of the device which contact with the liquid employed (excepting of course the recording surface) of brass or other non-corrosive material.

In the operation of the device to carry out my improved method, the upper sections 30 and 31 may together be separated from the lower sections, inverted and liquid poured into the reservoir $R^1$ through the tube 42. The chart cylinder 21 and its retained recording surface 20, (or other suitable recording surface suitably retained) is inserted in the chamber L. The upper sections 30 and 31 are then connected to the lower sections as shown, and the device lowered to the desired level in the hole to be measured. The liquid flows into chamber L as the device is lowered and its free surface gradually rises with respect to the recording surface. After the device has reached the desired point in the hole, the free surface of the liquid reaches the top of U-shaped automatic siphon, reacts upon the recording surface 20, and is removed from the chamber L by the siphon. The device may then be withdrawn from the hole, the recording surface removed and the angle of inclination determined from the record made by the liquid upon the recording surface.

For recording the liquid level, a great many combinations of various liquids and various recording surfaces may be used. In the preferred embodiment described herein, wherein a chart of paper or other flexible material is used, I prefer to coat or treat the chart with a water-sensitive substance, for instance dry methylene blue which is brown when dry but changes to blue when moistened. Water may then be used as the liquid, and the sharp line formed separating the moistened and unmoistened parts of the paper may be used to determine the inclination of the hole. If desired, and as indicated in Fig. 4, the paper may be ruled into standard squares.

Another example of the large number of other combinations of recording surfaces and liquids suitable for this use is a cylinder preferably of glass, coated with paraffin wax, with which may be used as a liquid mineral seal oil which dissolves that portion of the paraffin with which it contacts. A further example is a recording surface comprising an iron cylinder, with copper sulphate as the liquid. The copper sulphate deposits metallic copper on the portion of the cylinder with which it contacts. Still another example is a recording surface coated with potassium ferricyanide, using as the liquid in this case a solution of ferric chloride which causes the surface of the paper with which it contacts to change color.

The angle of inclination may easily be ascertained from the line made by the liquid on a paper chart, or from the similar developed curve taken from any cylindrical recording surface used, by the graphical construction shown in Fig. 4. If the instrument was in a vertical position in the hole when the record was made, then the record of the liquid level will be a continuous straight line. If the instrument was inclined to the vertical, then the liquid level will show as a curve, indicated at 70 in Fig. 4, from which the angle of the inclination can be quickly and accurately determined in the following manner. Two upright straight parallel lines 71 and 72 are drawn at a distance from each other equal to the diameter of the cylindrical recording surface. Then two horizontal straight parallel lines 73, 74 are drawn across these, touching the maximum and minimum parts of the record of the liquid level respectively, so that a parallelogram is formed by the intersections of the four lines. A straight line 75 is now drawn between two corners of this parallelogram and the angle between this line and the lower horizontal line is equal to the angle by which the axis of the cylinder deviated from the vertical when the record was taken in the bore hole. The paper can now be properly marked and dated, coated with paraffin or other suitable means and kept as a permanent record of the measurement.

I claim:

1. A device for recording inclination of a well bore, comprising a casing, a reservoir therein for holding a record making liquid, a chamber containing a surface on which a record is to be made by the liquid, means continuously open during the descent of the device into the well bore for timing the transfer of said liquid from said reservoir to the chamber, whereby a record may be made of the deviation of the bore at any point of its depth, said means comprising a restricted passage affording direct communication between said reservoir and chamber and controlling flow of liquid from the former to the latter, and means shielding the record surface from disturbances on the surface of the liquid in said chamber occasioned by the inflowing liquid.

2. A device for recording inclination of a well bore, comprising a casing, a reservoir therein for holding a record making liquid, a chamber containing a surface on which a record is to be made by the liquid, means continuously open during the descent of the device into the well bore for timing the transfer of said liquid from said reservoir to the chamber, whereby a record may be made of the deviation of the bore at any point of its depth, said means comprising a restricted passage affording direct communication between said reservoir and chamber, controlling flow of liquid from the former to the latter, and having its discharge end above the highest level attained by the liquid in said chamber, and means shielding the record surface from disturbances on the surface of the liquid in said chamber occasioned by the inflowing liquid.

3. A device for recording inclination of a well bore, comprising a casing, a reservoir therein for holding a record making liquid, a chamber containing a surface on which a record is to be made by the liquid, means continuously open during the descent of the device into the well bore for timing the transfer of said liquid from said reservoir to the chamber, whereby a record may be made of the deviation of the bore at any point of its depth, said means comprising a restricted passage affording direct communication between said reservoir and chamber and controlling flow of liquid from the former to the latter, and means providing an annular space of limited cross-section for containing said surface on which the record is to be made, the liquid entering the chamber without the bounds of said annular space.

4. A device for recording inclination of a well bore, comprising a casing, a reservoir therein for holding a record making liquid, a chamber containing a surface on which a record is to be made by the liquid, means continuously open during the descent of the device into the well bore for timing the transfer of said liquid from said reservoir to the chamber, whereby a record may be made of the deviation of the bore at any point of its depth, and means providing an annular space of limited cross-section for containing said surface on which the record is to be made, the annular space having a bottom opening through which the liquid rises to make the record, the limited cross-section of the annular space serving to prevent disturbances of the liquid from marring the record surface.

5. A device for recording inclination of a well bore, comprising a casing, a reservoir therein for holding a record making liquid, a chamber containing a surface on which a record is to be made by the liquid, means continuously open during the descent of the device into the well bore for timing the transfer of said liquid from said reservoir to the chamber, whereby a record may be made of the deviation of the bore at any point of its depth, and means providing an annular space of limited cross-section for containing said surface on which the record is to be made, the annular space having a bottom opening through which the liquid rises to make the record, the limited cross-section of the annular space serving to prevent disturbances of the liquid from marring the record surface.

6. A device for recording inclination of a well bore, comprising a casing, a reservoir therein for holding a record making liquid, the chamber containing a surface on which a record is to be made by the liquid, means continuously open during the descent of the device into the well bore for timing the transfer of said liquid from said reservoir to the chamber whereby a record may be made of the deviation of the bore at any point of its depth, said means comprising a passage having its discharge end above the highest level attained by the liquid in said chamber, and adapted to discharge liquid directly into said chamber, and means shielding the record surface from disturbances on the surface of the liquid in said chamber occasioned by the inflowing liquid.

HAROLD S. DAVIS.